(12) United States Patent
Murali et al.

(10) Patent No.: US 10,781,688 B2
(45) Date of Patent: Sep. 22, 2020

(54) FIXED-WAVELENGTH FIBER OPTIC TELEMETRY

(71) Applicant: Halliburton Energy Services, Inc., Houston, TX (US)

(72) Inventors: Srividhya Veeravalli Murali, Houston, TX (US); Daniel Joshua Stark, Houston, TX (US); David Yan Lap Wong, Humble, TX (US); Boguslaw Wiecek, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 113 days.

(21) Appl. No.: 16/066,093

(22) PCT Filed: Feb. 29, 2016

(86) PCT No.: PCT/US2016/020038
§ 371 (c)(1),
(2) Date: Jun. 26, 2018

(87) PCT Pub. No.: WO2017/151090
PCT Pub. Date: Sep. 8, 2017

(65) Prior Publication Data
US 2018/0371898 A1 Dec. 27, 2018

(51) Int. Cl.
*E21B 47/135* (2012.01)
*H04B 10/25* (2013.01)
*E21B 17/02* (2006.01)

(52) U.S. Cl.
CPC .......... *E21B 47/135* (2020.05); *E21B 17/023* (2013.01); *H04B 10/25891* (2020.05)

(58) Field of Classification Search
CPC .. E21B 47/123; E21B 17/023; H04B 10/2504
USPC ...................................... 340/854.7
See application file for complete search history.

(56) References Cited

U.S. PATENT DOCUMENTS

| | | | |
|---|---|---|---|
| 4,389,645 A | 6/1983 | Wharton | |
| 4,547,774 A | 10/1985 | Gould | |
| 5,808,779 A | 9/1998 | Weis | |
| 7,261,162 B2 | 8/2007 | Deans et al. | |
| 7,420,475 B2 | 9/2008 | Adnan et al. | |
| 7,515,774 B2 | 4/2009 | Vannuffelen et al. | |
| 7,929,812 B2 | 4/2011 | Vannuffelen et al. | |
| 8,274,400 B2 | 9/2012 | Wilson et al. | |
| 2002/0039465 A1 | 4/2002 | Skinner | |
| 2002/0196993 A1 | 12/2002 | Schroeder | |

(Continued)

FOREIGN PATENT DOCUMENTS

| | | |
|---|---|---|
| GB | 2474219 A | 6/2011 |
| WO | 2009154601 A1 | 12/2009 |

(Continued)

*Primary Examiner* — Emily C Terrell
(74) *Attorney, Agent, or Firm* — John Wustenberg; Parker Justiss, P.C.

(57) ABSTRACT

A system, in some embodiments, comprises: a light source; a fiber optic cable coupled to surface equipment and to downhole equipment and illuminated with fixed-wavelength light by said light source; and a modulator to modulate said fixed-wavelength light in the fiber optic cable to communicate data between the surface equipment and the downhole equipment, wherein the modulator uses a modified half-duplex telemetry scheme.

19 Claims, 15 Drawing Sheets

(56) References Cited

U.S. PATENT DOCUMENTS

| | | | |
|---|---|---|---|
| 2007/0062696 A1* | 3/2007 | Wilson | E21B 47/135 166/254.2 |
| 2007/0126594 A1 | 6/2007 | Atkinson et al. | |
| 2008/0143552 A1 | 6/2008 | Mallison et al. | |
| 2010/0018703 A1 | 1/2010 | Lovell et al. | |
| 2010/0194586 A1 | 8/2010 | Tjhang et al. | |
| 2010/0194588 A1 | 8/2010 | Menezes et al. | |
| 2011/0044697 A1* | 2/2011 | Peter | E21B 47/123 398/140 |
| 2011/0139447 A1 | 6/2011 | Ramos et al. | |
| 2011/0140907 A1 | 6/2011 | Louden | |
| 2011/0290992 A1* | 12/2011 | Sato | G01V 8/02 250/253 |
| 2012/0039561 A1 | 2/2012 | MacDougall et al. | |
| 2012/0067118 A1 | 3/2012 | Hartog et al. | |
| 2012/0257208 A1* | 10/2012 | Andersen | G01H 9/004 356/477 |
| 2012/0273269 A1 | 11/2012 | Rinzler et al. | |
| 2018/0269966 A1* | 9/2018 | Stark | H04B 10/0775 |

FOREIGN PATENT DOCUMENTS

| | | |
|---|---|---|
| WO | 2010096086 A1 | 8/2010 |
| WO | 2011094134 A2 | 8/2011 |
| WO | 2016171670 A1 | 10/2016 |
| WO | 2017151090 A1 | 9/2017 |

\* cited by examiner

FIXED-WAVELENGTH FIBER OPTIC TELEMETRY

CROSS-REFERENCE TO RELATED APPLICATION

This application is the National Stage of, and therefore claims the benefit of, International Application No. PCT/US2016/020038 filed on Feb. 29, 2016, entitled "FIXED-WAVELENGTH FIBER OPTIC TELEMETRY," which was published in English under International Publication Number WO 2017/151090 on Sep. 8, 2017. The above application is commonly assigned with this National Stage application and is incorporated herein by reference in its entirety.

BACKGROUND

Various tools are deployed downhole to collect data pertaining to subterranean formations. Collected data can be stored in the tool or elsewhere in a drill string or slickline sonde that houses the tool. In such systems, the data is often recovered when the storage is raised to the surface. Alternatively, data may be transmitted to the surface as it is collected. Different telemetry techniques may be employed to transmit data from the tool in the wellbore to the surface. Similar telemetry techniques can be used to transmit data from the surface to the tool in the wellbore. Current telemetry techniques, however, use expensive, unnecessary equipment and suffer from technical shortcomings that adversely impact communication quality.

BRIEF DESCRIPTION OF THE DRAWINGS

Accordingly, there are disclosed in the accompanying drawings and in the following description various fixed-wavelength fiber optic telemetry systems. In the drawings.

DETAILED DESCRIPTION

Disclosed herein is a fiber optic telemetry system—usable in both slickline and wireline applications—that employs fixed-wavelength light to communicate data between downhole equipment and surface equipment. The system includes any suitable downhole equipment, such as a tool that obtains measurements pertaining to subterranean formations. The system includes processing equipment (e.g., amplifiers, microprocessors, digitizers) that process the signal to be transmitted. The processing equipment couples to a fiber optic cable that is illuminated using any appropriate type of fixed-wavelength light source, such as a fixed-wavelength laser or a fixed-wavelength light emitting diode (LED). The processing equipment modulates the fiber optic light with the digitized signal using any suitable modulation technique, such as pulse frequency modulation or phase modulation. In some embodiments, the signal is not digitized and the fiber optic light is intensity-modulated (e.g., amplitude modulated) or phase modulated. In any case, the fiber optic cable transports the modulated light from the downhole equipment to the surface equipment or vice versa, where the light is demodulated and processed to reconstruct the original data signal. Although this technique may primarily be applied in the wireline and slickline contexts, it may be adapted for implementation in other contexts (e.g., wired drill pipe, production tubing, permanent well integrity monitoring) as well.

The use of fixed-wavelength light mitigates the wavelength filtering problems that arise in some such variable-wavelength systems. In addition, illuminating the fiber optic cable using fixed-wavelength light reduces the number of components necessary in the system. For instance, multiple light sources and/or multiple fiber optic cables are no longer required. Thus, both communication quality and cost efficiency improve.

Figure 1:
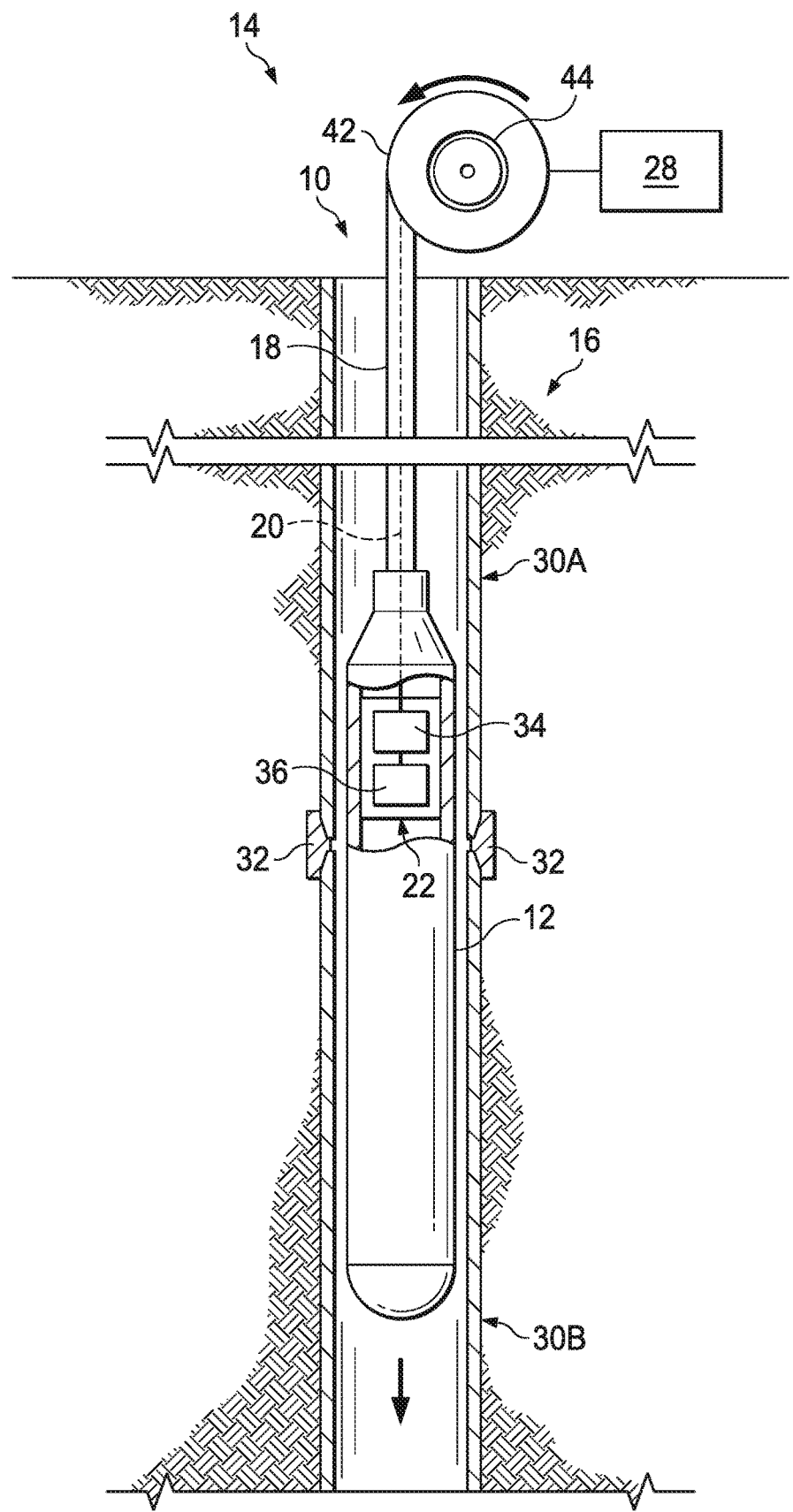
FIG. 1 is a schematic diagram of an illustrative slickline or wireline application.

FIG. 1 provides a side elevation view of a well 10 with an illustrative wireline tool system 14 including surface equipment and downhole equipment. The downhole equipment includes a sonde 12 suspended in the well 10 at least in part by a cable 18 having one or more optical fiber(s) 20. The well 10 is cased with a casing string 16 having casing sections 30A and 30B connected end-to-end by a collar 32. As is typical, the casing sections 30A, 30B of the casing string 16 and the collars connecting the casing sections 30A, 30B (e.g., the collar 32) are made of steel, an iron alloy, and hence it exhibits a fairly high magnetic permeability and a relatively low magnetic reluctance. In other words, the casing string material conveys magnetic field lines much more readily than air and most other materials. The illustrated sonde 12 houses a tool 22. Surface equipment 28 is coupled to the sonde 12 via the cable 18 containing optical fibers and configured to receive optical signals from the sonde 12 via the optical fiber(s) 20.

In the embodiment of FIG. 1, the tool 22 is configured to generate an electrical data signal based on the detection of some entity or measurement of some quantity in the surrounding formation. The tool 22 converts the electrical signal into an optical signal, and transmits the optical signal to the surface unit 28 via the optical fiber(s) 20 of the cable 18. In some embodiments, a signal generated by the tool 22 is converted into an optical signal and transmitted to the surface by components external to the tool 22. The tool 22 is not limited to any particular functionality and may include, for instance, a casing collar locator (CCL), a caliper, a porosity tool, a permeability tool, a resistivity tool, etc. Similarly, the scope of this disclosure is not limited to one-way communications. To the contrary, the downhole equipment (such as the tool 22) may send signals to the surface and surface equipment may send signals downhole.

In the embodiment of FIG. 1, the tool 22 includes an optical interface 34 coupled to the optical fiber(s) 20, and a sensor 36 coupled to the optical interface 34. The sensor 36 is intended to be a generic sensor that represents a variety of sensing equipment that may be used in a wide array of different tools. The sensor 36 produces an electrical signal in response to a particular measurement (e.g., magnetic field changes attributable to passing casing collars in case the tool 22 is a CCL).

The optical interface 34 of the tool 22 may include a light source controlled or modulated by the electrical signal received from the sensor 36, thereby producing an optical signal. The light source may include, for example, an incandescent lamp, an arc lamp, an LED, a laser, an amplified spontaneous emission source, or a super-luminescent diode. The optical interface 34 transmits an optical signal to the surface equipment 28 via the optical fiber(s) 20 of the cable 18. The surface equipment 28 processes the optical signal received via the optical fiber(s) 20 to reconstruct the original data signal generated by the tool 22.

In at least some embodiments, the surface equipment 28 includes a photodetector that receives the optical signal and converts it into an electrical signal (e.g., a voltage or a current) dependent on one or more characteristics of the optical signal. The photodetector may be or include, for example, a photodiode, a photoresistor, a charge-coupled device, or a photomultiplier tube. In some embodiments, the light source of the tool 22, described above, may instead be positioned within or in communication with the surface equipment 28. In such embodiments, even though the light source is located at the surface, the downhole equipment may modulate the light that illuminates the optical fiber(s) 20. In at least some embodiments, light that illuminates the optical fiber(s) 20—regardless of the location of the light source that generates that light—is of a fixed wavelength, meaning that the wavelength of that light is constant or varies by no more than 5% in either direction from a baseline wavelength. In some embodiments, only one light source illuminates the optical fiber(s) of the cable 18. The contents of the surface equipment 28 are described in greater detail below.

In the embodiment of FIG. 1, the cable 18 preferably also includes armor to add mechanical strength and/or to protect the cable from shearing and abrasion. Some of the optical fiber(s) 20 may be used for power transmission, communication with other tools, and redundancy. The cable 18 may, in some cases, also include electrical conductors if desired. The cable 18 spools to and from a winch 42 as the sonde 12 is conveyed through the casing string 16. The reserve portion of the cable 18 is wound around a drum of the winch 42, and the cable 18 having been dispensed or unspooled from the drum supports the sonde 12 as it is conveyed through the casing string 16.

In the illustrated embodiment, the winch 42 includes an optical slip ring 44 that enables the drum of the winch 42 to rotate while making an optical connection between the optical fiber(s) 20 and corresponding fixed port(s) of the slip ring 44. The surface equipment 28 is connected to the port(s) of the slip ring 44 to send and/or receive optical signals via the optical fiber(s) 20. In other embodiments, the winch 42 includes an electrical slip ring 44 to send and/or receive electrical signals from the surface equipment 28 and an electro-optical interface that translates the signals from the optical fiber 20 for communication via the slip ring 44 and vice versa.

Figure 2A:
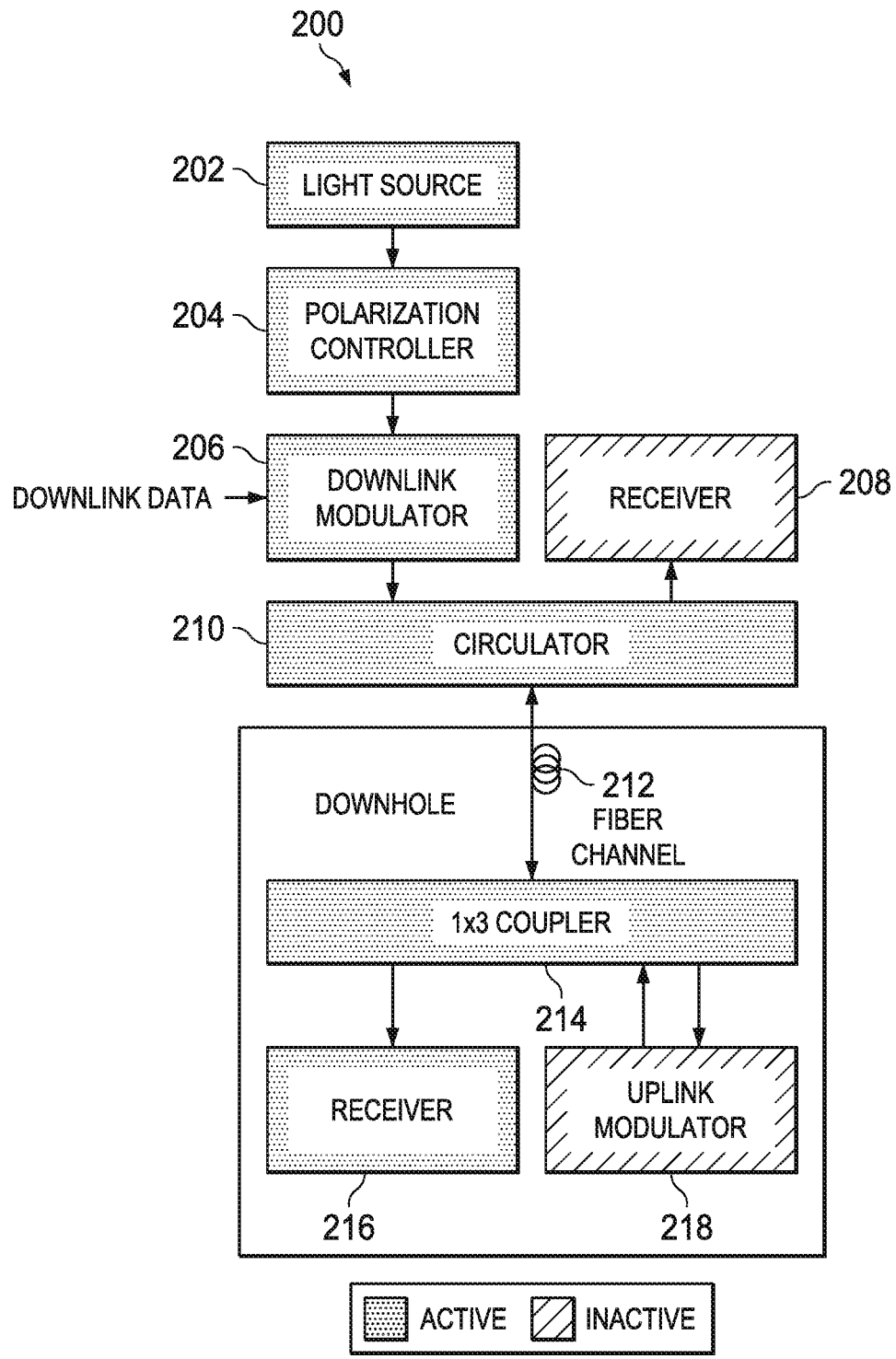
FIGS. 2-11 are block diagrams of various fixed-wavelength fiber optic telemetry systems.
Figure 2B:
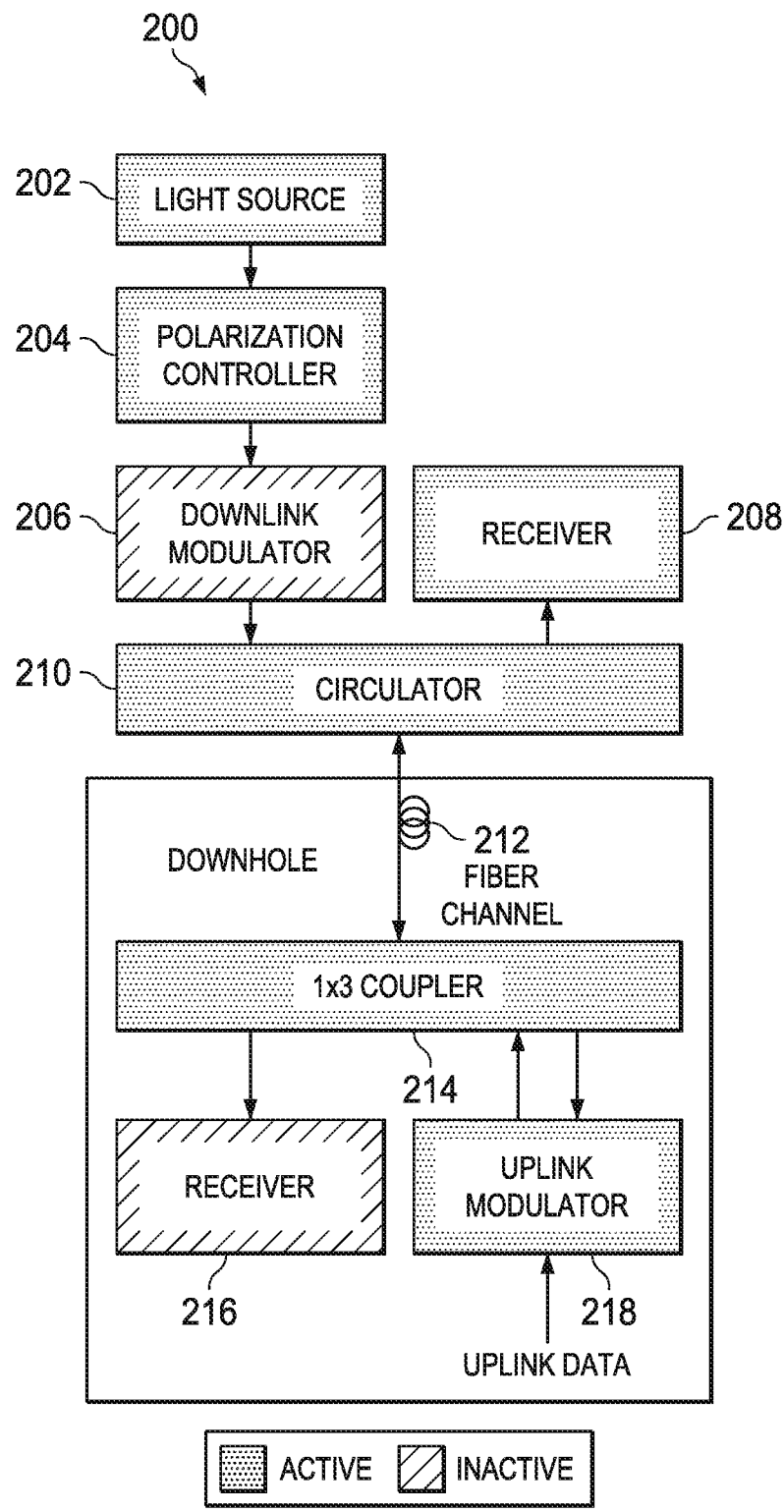

FIG. 2A is a conceptual block diagram of an optical telemetry system 200. The system 200 includes a light source 202, a polarization controller 204, a downlink modulator 206, a receiver 208, and a circulator 210 (which, in some embodiments, is located immediately before the slip ring 44), all of which may collectively be considered as "surface equipment" and may be housed within and/or coupled to, e.g., the surface equipment 28 depicted in FIG. 1. The system 200 also includes a coupler 214 (e.g., a 1×3 coupler), a receiver 216 and an uplink modulator 218, all of which may collectively be considered as "downhole equipment" and may be housed within and/or coupled to, e.g., the sonde 12 depicted in FIG. 1. The surface equipment and downhole equipment communicate via fiber channel 212 (i.e., within a fiber optic cable). As the shading in FIG. 2A indicates, blocks 202, 204, 206, 210, 214 and 216 are used to transmit data in a downlink session—i.e., transmit data from the surface equipment to downhole equipment. FIG. 2B, which also depicts system 200 and is described below, depicts blocks 202, 204, 208, 210, 214 and 218 being used to transmit data in an uplink session—i.e., transmit data from the downhole equipment to surface equipment.

The light source 202 may be any suitable type of light source, including a laser, light emitting diode, super-luminescent diode, or amplified spontaneous emission source. In some embodiments, the light source 202 operates at wavelengths between 400 nm and 2500 nm. In some embodiments, the light source 202 operates with coherence lengths between 1 micron and 2000 km. The polarization controller 204 adjusts the polarization of the light output by the light source 202 for optimal use. (If the light source 202 is depolarized, the polarization controller 204 is unnecessary. Further, in some embodiments, a polarization scrambler may be used in lieu of the polarization controller 204.) The polarization controller 204 may adjust polarization manually or electronically and may use fiber strain, compression, torsion and/or temperature techniques. Other optical devices may be used to condition the light, such as optical filters, optical isolators, optical decoherers, optical amplifiers, optical attenuators, and the like. In at least some embodiments, the light output by the light source 202 has a fixed wavelength. A "fixed wavelength" may mean either a constant wavelength with no variation or a wavelength that varies no more than 5% in either direction from a baseline wavelength. In at least some embodiments, the light source 202 is the only light source that illuminates the fiber channel 212, and in some such embodiments, the light source 202 is positioned downhole instead of at the surface. In some embodiments, multiple light sources may be used to illuminate the fiber channel 212 (e.g., one light source at the surface and another light source downhole; two light sources at the surface). All such variations are contemplated and included within the scope of disclosure.

The downlink modulator 206 modulates the light output by the polarization controller 204 to include the data to be transmitted downhole (i.e., in a "downlink" session). Any suitable modulation technique may be used. For example, in some embodiments, the modulator 206 modulates the intensity (i.e., amplitude) of the light according to an analog signal to be transmitted downhole. In some embodiments, the modulator 206 modulates the light using pulse frequency modulation based on a digital signal to be transmitted downhole. In still other embodiments, the modulator 206 modulates the light using phase modulation based on a digital signal to be transmitted downhole. Other modulation techniques also are contemplated. In some embodiments, the modulator 206 comprises an electro-optic modulator, an electro-absorption modulator, a semiconductor optical amplifier, an optical switch, a ring resonator, or a fiber attenuator. In some embodiments, the modulator 206 operates on light having wavelengths between 400 nm and 2500 nm. In some embodiments, the modulator 206 modulates from 1 Hz to 100 GHz. The modulator 206 may maintain polarization or be polarization insensitive. The modulator 206 may also modulate the polarization to convey data through altered polarization states. In some embodiments, the modulator 206 must be maintained at maximum power output while the system is in uplink mode (e.g., as shown in FIG. 2B).

The circulator 210 directs light from the modulator 206 to the fiber channel 212 and from the fiber channel 212 into the receiver 208 (the latter in case of uplink sessions, as shown in FIG. 2B, or as a reliability monitor in case of downlink sessions). The fiber channel 212 passes light between the surface and downhole equipment. In some embodiments, the length of the fiber channel 212 is up to 18 km. In some embodiments, the fiber channel 212 comprises pure silica or is doped with erbium, ytterbium, neodymium, quantum dots, nanoparticles, and/or boron. The fiber channel 212 may be single mode, multi-mode, or polarization-maintaining. The fiber channel 212 may be jacketed with polyimide, silicone-perfluoroalkoxy, other polymers, a metal, or carbon composite. The fiber channel 212 is housed within a larger, composite fiber optic cable (e.g., cable 18 in FIG. 1) that can include electrically conducting lines, other optical fibers, and/or structural support.

The coupler 214 splits the light from a single fiber channel 212 into multiple channels. In FIG. 2A, the coupler 214 is depicted as being a 1×3 coupler that divides the light from the fiber channel 212 into three channels, although the scope of disclosure is not limited as such. One of the channels couples to the downlink receiver 216, and the other two channels couple to the uplink modulator 218. The coupler 214 also recombines the three channels into the single fiber channel 212. In some embodiments, the coupler 214 comprises pure silica or is doped with erbium, ytterbium, neodymium, quantum dots, nanoparticles, and/or boron. In some embodiments, the coupler 214 is single-mode, multi-mode or polarization-maintaining. In some embodiments, the coupler 214 is jacketed with polyimide, silicone-perfluoroalkoxy, other polymers, a metal, or carbon composite.

The downlink receiver 216 converts optical power to voltage for processing. In some embodiments, the receiver 216 operates to 300 degrees Celsius. In some embodiments, the receiver 216 comprises a photodiode, a photomultiplier tube or a thermopile. In some embodiments, the receiver 216 operates on light having a wavelength between 400 nm and 2500 nm. In some embodiments, the receiver 216 detects signals between 1 Hz and 100 GHz. In some embodiments, the receiver 216 has a sensitivity between 0 dBm and −80 dBm.

In some embodiments, the circulator 210 may be configured to provide a downlink signal from the downlink modulator 206 to the 1×3 coupler 214 and, in addition, the same downlink signal may be provided to the surface receiver 208. (In at least some such embodiments, the circulator 210 may be replaced by any other suitable type of hardware that can perform this specific routing function.) By providing a copy of the downlink signal to the surface receiver 208, the quality of the downlink signal can be verified and any problems with the downlink signal can be corrected.

As alluded above, FIG. 2B shows the same system 200 as FIG. 2A, but it highlights those components that are used to communicate data in an uplink session—i.e., from downhole equipment to surface equipment. Specifically, the light source 202 and polarization controller 204 are still used to help illuminate the fiber channel 212. However, the downlink modulator 206 is not used to modulate downlink data, and the downlink receiver 216 is not used to receive downlink data. Instead, as depicted by the shaded components in FIG. 2B, during an uplink session the uplink modulator 218 is used to modulate light illuminating the fiber channel 212 and the uplink receiver 208 is used to receive data from the fiber channel 212. The uplink modulator 218 and uplink receiver 208 are inactive in the system of FIG. 2A.

The uplink modulator 218 may modulate light in the same or substantially similar way as the downlink modulator 206. The uplink receiver 208 may receive and process light in the same or substantially similar way as the downlink receiver 216. In some embodiments, the uplink receiver 208 has a sensitivity between 0 dBm and −80 dBm and can be cooled using Peltier coolers, heat sinks, heat fins, or cryocoolers.

In some embodiments, the coupler 214 may be configured to provide an uplink signal from the uplink modulator 218 to the circulator 210 and, in addition, the same uplink signal may be provided to the downlink receiver 216. (In at least some such embodiments, the coupler 214 may be replaced by any other suitable type of hardware that can perform this specific routing function.) By providing a copy of the uplink signal to the downlink receiver 216, the quality of the uplink signal can be verified and any problems with the uplink signal can be corrected.

Figure 3:
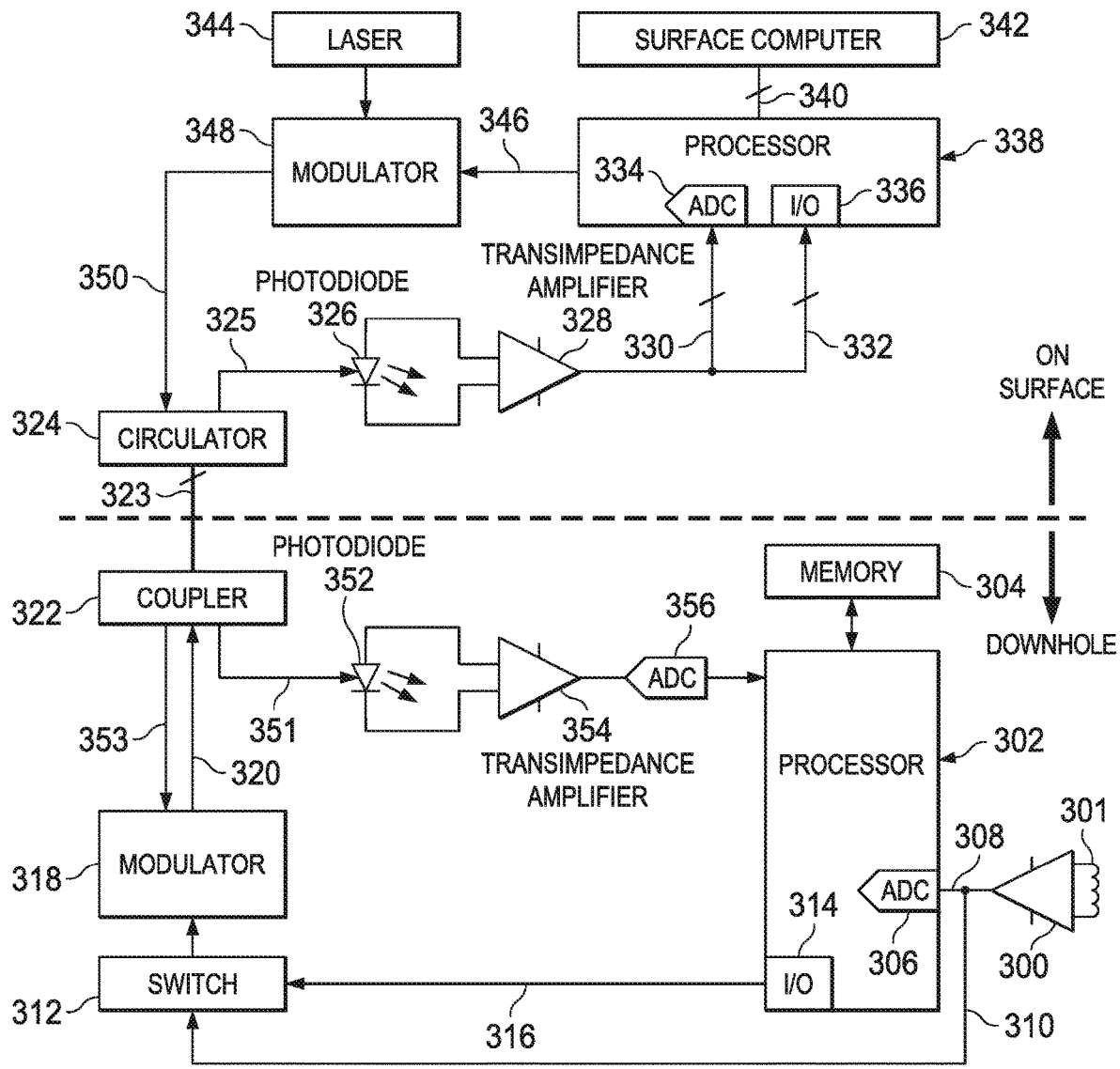

FIG. 3 is a block diagram of an illustrative optical telemetry system and is a more detailed depiction of the system shown in FIG. 2. Specifically, a portion 301 of a tool (e.g., a CCL coil) couples to an amplifier 300. The output of the amplifier 300 is provided to analog-to-digital converter (ADC) 306 via connection 308. The ADC 306 forms part of a processor 302, which couples to a memory 304 (e.g., volatile or permanent memory) and further comprises an input/output (I/O) port 314. A switch 312 couples to the I/O port 314 and the amplifier 300 via connections 316 and 310, respectively. The output of the switch 312 couples to a modulator 318, the output of which couples to a coupler 322 via connection 320. The coupler 322 couples to the modulator 318 via connection 353 and to photodiode 352 via connection 351. The photodiode 352, in turn, couples to a transimpedance amplifier 354, and the amplifier 354 couples to an ADC 356. The ADC 356 couples to the processor 302. In at least some embodiments, the components 300, 302, 304, 306, 312, 314, 318, 322, 352, 354 and 356 form some or all of the optical interface 34 (FIG. 1).

The coupler 322 couples to circulator 324 (at the surface) via a fiber optic cable 323. Circulator 324 couples to photodiode 326 via connection 325, and the photodiode 326 couples to a transimpedance amplifier 328. The amplifier 328, in turn, couples to an ADC 334 via connection 330 and to an I/O port 336 via connection 332. The port 336 and ADC 334 form part of a processor 338, which couples to a surface computer 342 via connection 340 and to a modulator 348 via connection 346 that is driven by a light source (e.g., a laser) 344. The modulator 348 couples to the circulator 324 via connection 350. In some embodiments, at least connections 350, 323, 353, 320, 351, and 325 are fiber optic cable connections.

In operation, the signal from the portion 301 of the downhole tool is amplified by the amplifier 300, and the amplified signal is provided to ADC 306 and to the switch 312. The signal that is provided directly to the switch 312 via the connection 310 is an analog signal. The signal provided to the ADC 306 is also analog but is digitized and the processor 302 subsequently generates a spectrum-shifted, pulse frequency modulated signal at the I/O port 314. The analog signal on connection 310 and the digital signal on connection 316 are provided to switch 312. The switch 312 is preferably controlled by the processor 302. The switch 312 permits either the analog signal or the digital signal to pass to the modulator 318. The modulator 318 receives light from light source 344 on the connection 353. The modulator 318 modulates the light within the fiber optic cable 353 using any suitable modulation technique. For example, in some embodiments, the modulator 318 modulates the intensity (i.e., amplitude) of the light according to the analog signal received on connection 310. In some embodiments, the modulator 318 modulates the light using pulse frequency modulation based on the digital signal received on the connection 316. In still other embodiments, the modulator 318 modulates the light using phase modulation based on the digital signal received on the connection 316. Other modulation techniques also are contemplated.

The modulated optical signal is provided to the coupler 322 via connection 320. The coupler 322 routes the modulated optical signal to the surface via the fiber optic cable 323. The circulator 324 routes the modulated optical signal to the photodiode 326, which converts the modulated optical signal to an electrical signal that is amplified by the amplifier 328. The resulting analog or digital signal is provided to the ADC 334 or the I/O port 336, as appropriate. The processor 338 then processes the resulting signal to reconstruct the original signal and provides the reconstructed signal to a surface computer 342 to be used as desired. In this way, signals are periodically or continuously communicated from the downhole to the surface computer 342.

The aforementioned spectrum-shifted, pulse frequency encoding and modulation of the digitized signal may be performed in any suitable manner. In at least some embodiments, the encoding and modulation are performed as follows. First, the amplitude of the analog to be digitized is determined. The amplitude is assigned to one of a plurality of digital values. The number of possible digital values depends at least in part on the number of bits used to encode the digitized signal. For example, for an 8-bit signal, there are 256 possible digital values, and each of these values is assigned to a different pulse frequency (shifted by a predetermined amount, e.g., 100 kHz). Thus, for instance, 100 kHz could represent the 8-bit signal "00000000," while 355 kHz could represent the 8-bit signal "11111111." A data structure containing the digital value-to-pulse frequency mapping is accessible to both processors 302, 338. To reconstruct the modulated signal, the processor 338 determines the pulse frequency of the optical signal and uses its data structure to determine the original analog signal. Phase-modulated and amplitude-modulated signals may be similarly reconstructed.

In at least some embodiments, the aforementioned optical signal in the fiber optic cable is generated by a single light source 344 (e.g., a laser source) at the surface. In such embodiments, there are no other light sources illuminating the fiber optic cable. In some embodiments, the single light source may be located downhole—for example, in the sonde, and in such embodiments, there are no other light sources illuminating the fiber optic cable. In either case, the light generated by the light source preferably has a fixed wavelength, which is what gives rise to the need for only a single light source. The wavelength is "fixed" in the sense that it either does not vary or only varies within a small, predetermined range—in at least some embodiments, within +/−5% of the original, baseline wavelength used during a particular telemetry session. The specific wavelength used may be selected as desired and as may be suitable. The light generated by the light source 344 is provided to modulator 348, which modulates the light with data signals that are to be transmitted downhole. Such data signals are generated by the processor 338 and/or by the surface computer 342 and are provided to the modulator 348 via connection 346. The modulator 348 may use any suitable modulation technique, such as intensity (i.e., amplitude) modulation, phase modulation and/or pulse-frequency modulation, as described above. Other modulation techniques are contemplated.

The modulated signal is provided to the circulator 324 via connection 350. The circulator 324 directs light from the modulator 348 to the fiber optic cable 323. The coupler 322 splits the single optical channel in the fiber optic cable 323 into three separate channels (i.e., on connections 351, 320, 353). The coupler 322 routes the incoming signal to the photodiode 352, where the modulated optical signal is converted into an electrical signal that is amplified by the transimpedance amplifier 354 and converted to digital format by ADC 356. The digital signal is then provided to the processor 302 to be used as desired.

As explained above, FIGS. 2A-2B depict a general optical telemetry system, and FIG. 3 is a more detailed depiction of the systems in FIGS. 2A-2B. FIGS. 4-11, described below, are alternative versions of the systems in FIGS. 2A-2B. Accordingly, the system shown in FIG. 3 may be modified as necessary and as may be suitable to adapt to the various embodiments of FIGS. 4-11 (e.g., by adding, removing or modifying components). In at least some embodiments, the systems depicted in FIGS. 4-11 contain light sources that generate fixed-wavelength light.

Figure 4:
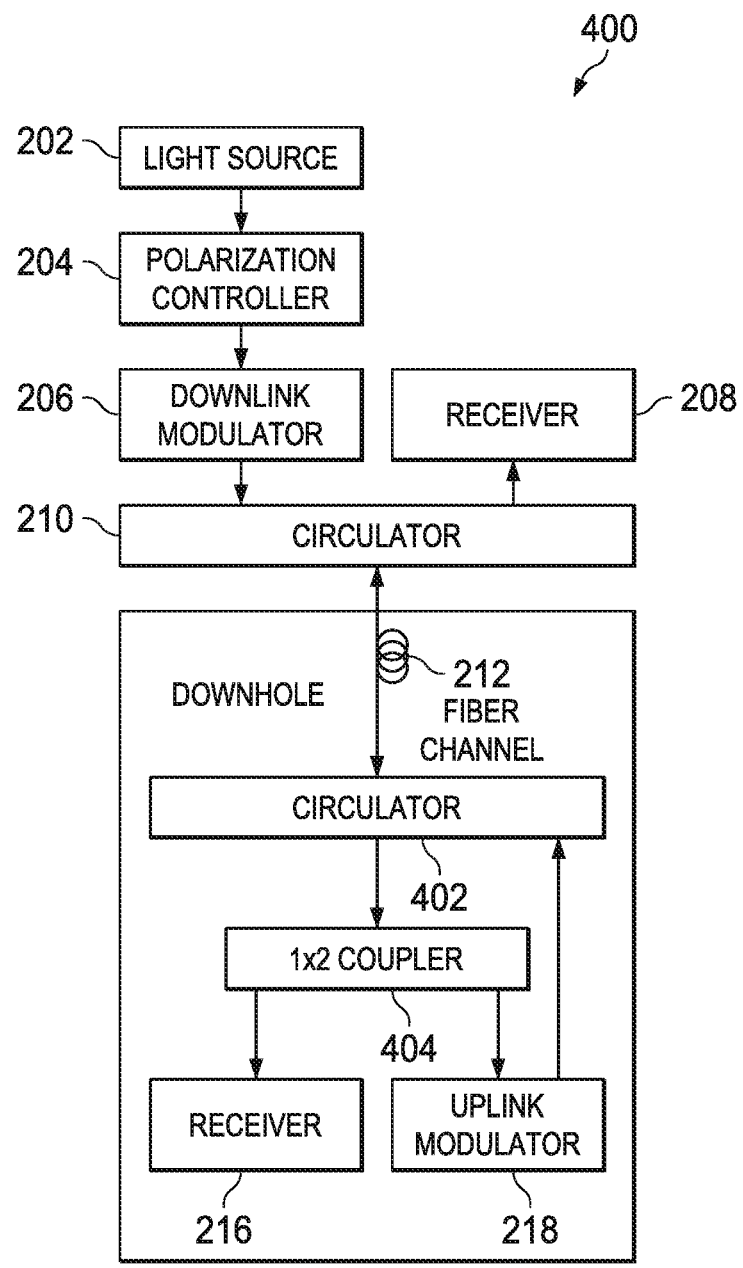

FIG. 4 is a block diagram of another illustrative optical telemetry system and is an alternative to the systems shown in FIGS. 2A-2B. FIG. 4 shows a system 400 that includes many of the same components as the systems 200 of FIGS. 2A-2B. These components include the light source 202, the polarization controller 204, the downlink modulator 206, the receiver 208, the circulator 210, the fiber channel 212, the receiver 216 and the uplink modulator 218. The system 400 includes additional components not shown in the systems 200 of FIG. 2A-2B. Specifically, the system 400 includes a circulator 402 and a coupler 404 (e.g., a 1×2 coupler). The circulator 402 is used to ensure that the light in the fiber optic channel passing through the uplink modulator 218 only passes in one direction through the modulator 218 (i.e., from the coupler 404, through the modulator 218 and back to the circulator 402) when the system 400 is operating in an uplink telemetry mode. The 1×3 coupler 214 of FIGS. 2A-2B is replaced in FIG. 4 by the 1×2 coupler 404.

Figure 5:
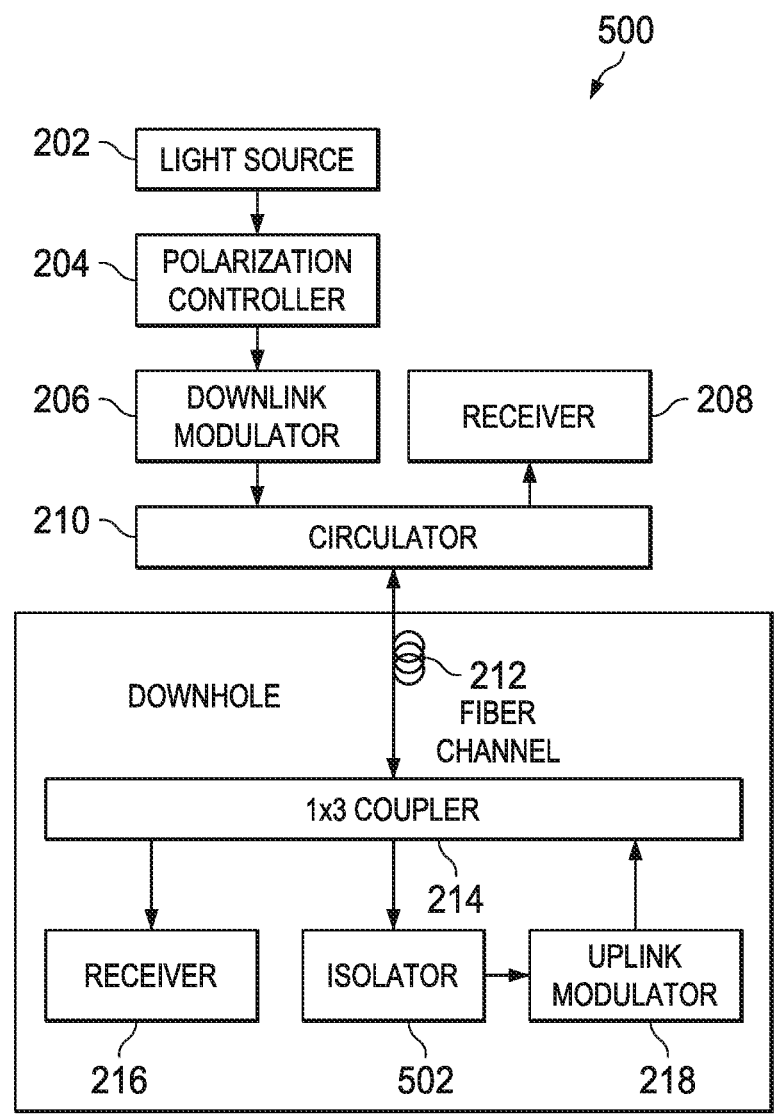

FIG. 5 is a block diagram of another illustrative optical telemetry system and is an alternative to the systems shown in FIGS. 2A-2B. The system 500 depicted in FIG. 5 is similar to those shown in FIGS. 2A-2B in that it contains the light source 202, polarization controller 204, downlink modulator 206, receiver 208, circulator 210, fiber channel 212, coupler 214 (e.g., a 1×3 coupler), receiver 216 and uplink modulator 218. The system 500 differs from the systems 200 of FIGS. 2A-2B in that the system 500 further includes an uplink isolator 502. The isolator 502 ensures that light travels in only one direction through the modulator 218 when the system 500 is operating in an uplink telemetry mode (e.g., from coupler 214 to isolator 502, and from isolator 502 to modulator 218, and from modulator 218 to the coupler 214). The isolator 502 reduces inter-symbol interference of uplink data at high data rates.

Figure 6:
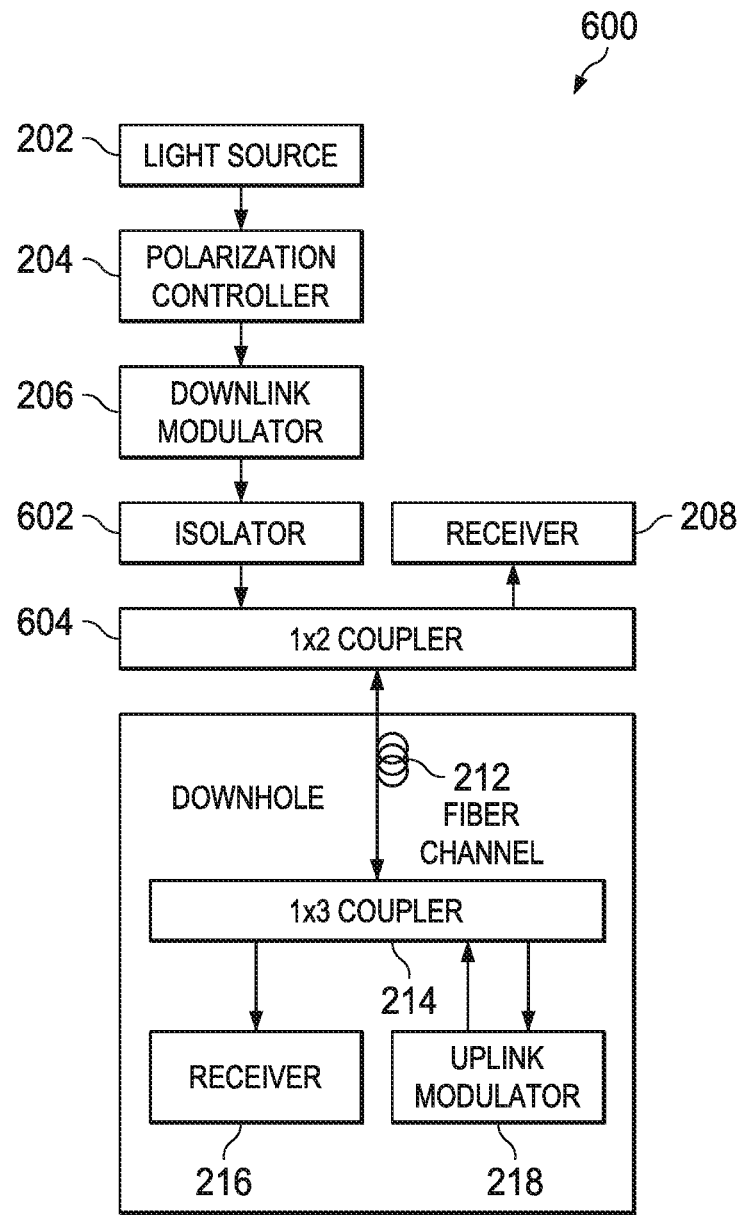

FIG. 6 is a block diagram of another illustrative optical telemetry system and is another alternative to the systems shown in FIGS. 2A-2B. The system 600 depicted in FIG. 6 is similar to those shown in FIGS. 2A-2B in that it contains the light source 202, polarization controller 204, downlink modulator 206, receiver 208, fiber channel 212, coupler 214 (e.g., a 1×3 coupler), receiver 216, and uplink modulator 218. The system 600 differs from the systems 200 of FIGS. 2A-2B in that the system 600 further includes an isolator 602 and a coupler 604 (e.g., a 1×2 coupler). By using the isolator 602 and the coupler 604, the wavelength of the light source may be altered without significant reduction in telemetry quality (compared to the use of a circulator).

Figure 7:
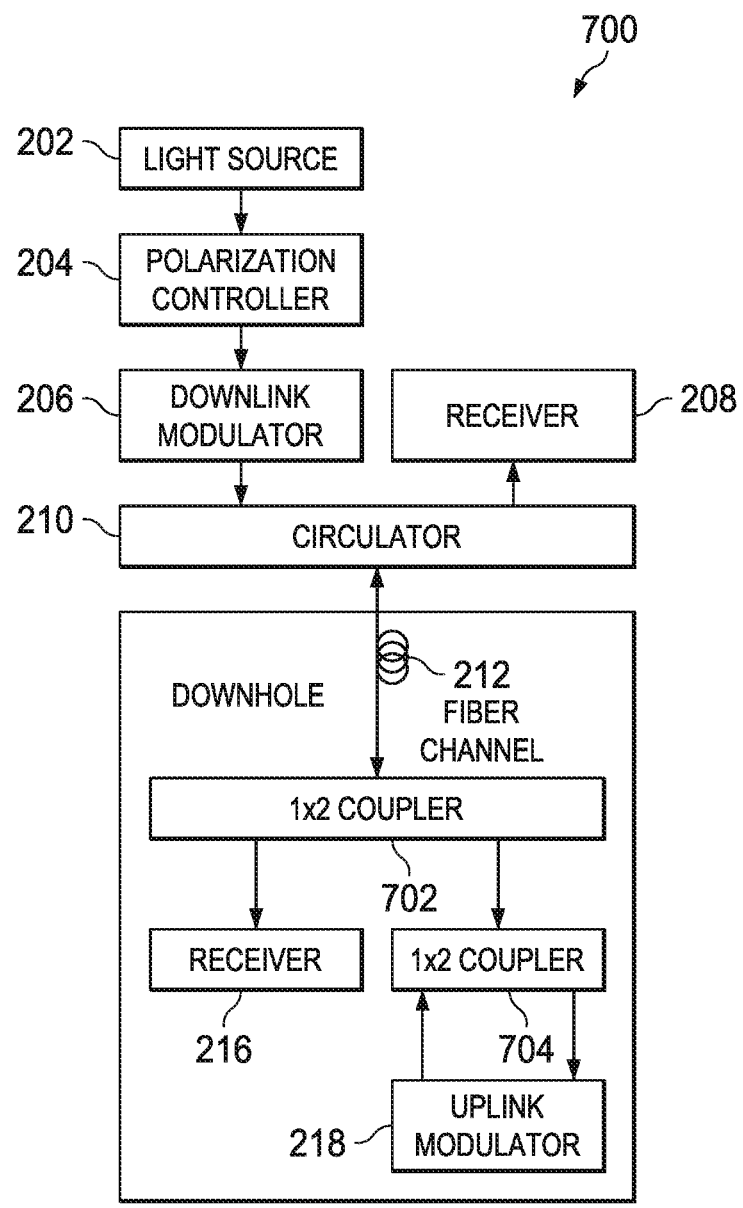

FIG. 7 is a block diagram of another illustrative optical telemetry system and is another alternative to the systems shown in FIGS. 2A-2B. The system 700 depicted in FIG. 7 is similar to those shown in FIGS. 2A-2B in that it contains the light source 202, polarization controller 204, downlink modulator 206, receiver 208, circulator 210, fiber channel 212, receiver 216 and uplink modulator 218. The system 700 differs from the systems 200 of FIGS. 2A-2B in that the system 700 further includes a coupler 702 (e.g., a 1×2 coupler) and a coupler 704 (e.g., a 1×2 coupler). The 1×2 couplers, such as couplers 702 and 704, can operate at high temperatures and are commercially available in high volumes at low costs. Thus, using the system 700 instead of the systems 200 depicted in FIGS. 2A-2B may enhance cost efficiencies.

Figure 8:
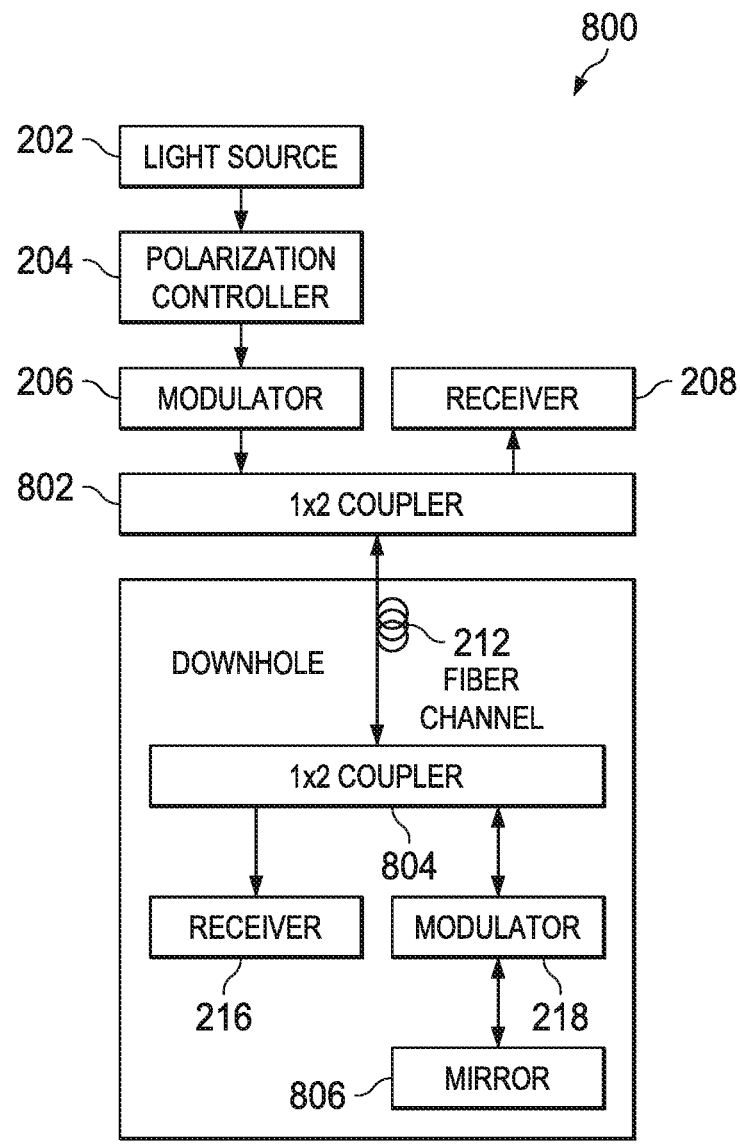

FIG. 8 is a block diagram of another illustrative optical telemetry system and is another alternative to the systems shown in FIGS. 2A-2B. The system 800 depicted in FIG. 8 is similar to those shown in FIGS. 2A-2B in that it contains the light source 202, polarization controller 204, modulator 206, receiver 208, fiber channel 212, receiver 216 and uplink modulator 218. The system 800 differs from the systems 200 of FIGS. 2A-2B in that the system 800 further includes a coupler 802 (e.g., a 1×2 coupler), a coupler 804 (e.g., a 1×2 coupler), and a fiber mirror 806. In at least some embodiments, the fiber mirror 806 comprises a Faraday rotator mirror. In at least some embodiments, the fiber mirror 806 comprises a chemically coated fiber tip. The coated fiber tip may be coated with aluminum, silver or gold with reflectivities of over 95%, 97.5%, and 99%, respectively, at 1 micrometer and above. The fibers may be coated using evaporation, sputtering or chemical processes (such as Brashear's Method or Böttger's Rochelle Salt Method). By using one or more of the 1×2 couplers as shown and by including the fiber mirror 806, the power delivered to both the downlink and uplink receivers 216, 208 can be increased. Further, by passing the light twice through the uplink modulator 218, voltage changes on the uplink data may be reduced while still obtaining the same signal modulation depth. The mirror 806 provides a command protocol enhancement by echoing data from the surface back to the surface for confirmation. The mirror 806 also provides a hardware confirmation for the test setup without having to feed data into the downhole modulator 218. By transmitting data through the surface modulator 206, the hardware in the downlink data path (206, 802, 212, 804, 216) and uplink data path (806, 218, 804, 212, 802, 208) can be verified to ensure they are operational and functional, and the mirror 806 acts as a quality indicator for the fiber connections by comparing the original data signal sent uphole and the resultant signal at the surface receiver 208.

Figure 9:
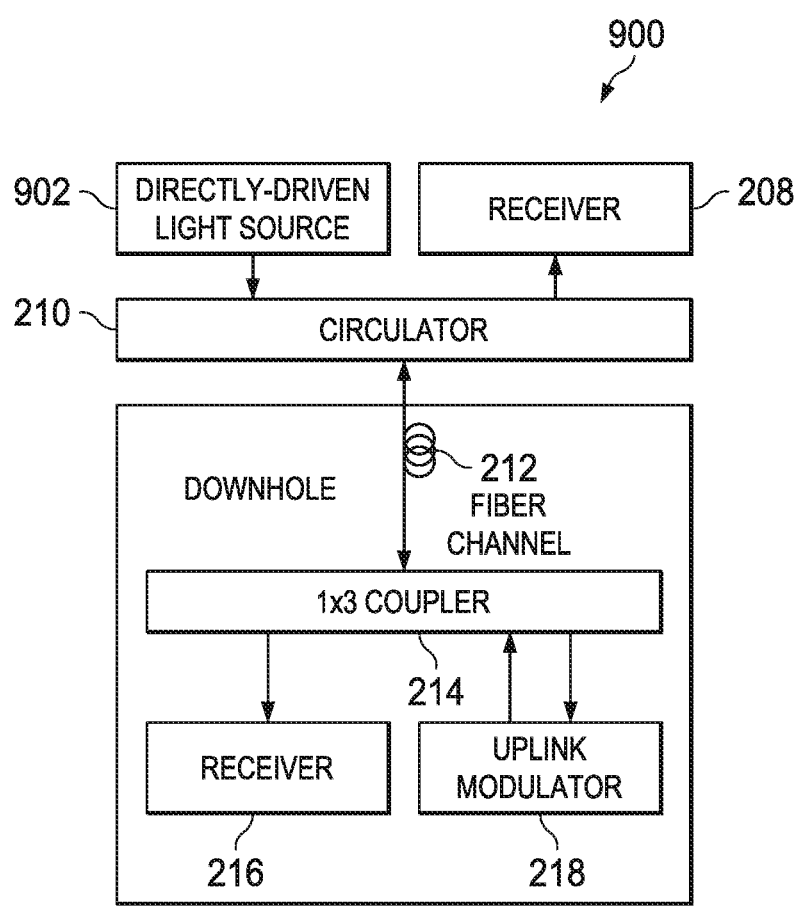

FIG. 9 is a block diagram of another illustrative optical telemetry system and is another alternative to the systems shown in FIGS. 2A-2B. The system 900 depicted in FIG. 9 is similar to those shown in FIGS. 2A-2B in that it contains the receiver 208, circulator 210, the fiber channel 212, the coupler 214, the receiver 216, and the uplink modulator 218. The system 900 differs from the systems 200 of FIGS. 2A-2B in that the system 900 further includes a directly-driven light source 902. In lieu of generating light and subsequently modulating it as is done in the systems 200 of FIGS. 2A-2B, the directly-driven light source 902 directly modulates the light as the light is generated. This is accomplished by manipulating the current passing through the light source 902—for example, using a switch. By rapidly switching the current on and off or by adjusting the current in an analog fashion, data can be modulated directly using the light source. This technique is more cost effective and robust than separately generating and modulating light, and it also reduces the polarization sensitivity of the system as polarization compatibility between the light source and the downlink modulator has been removed. As with the light source 202, the directly-driven light source 902 produces fixed-wavelength light.

Figure 10A:
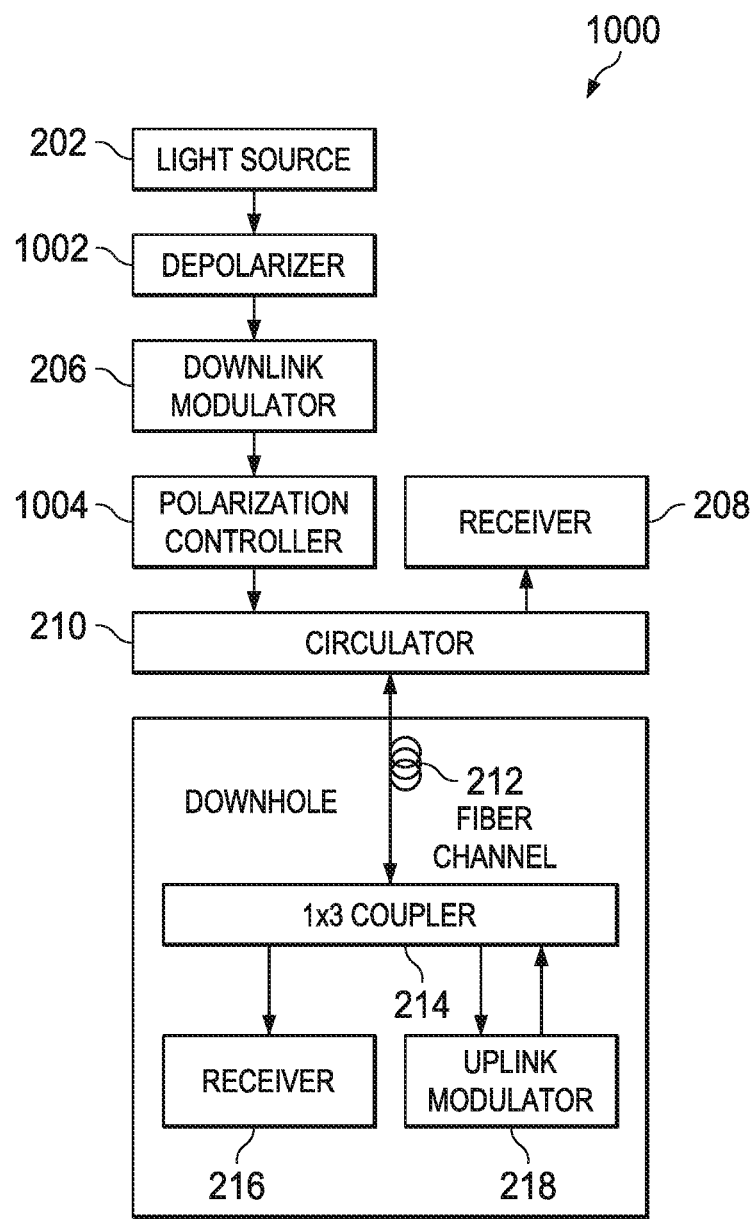

FIG. 10A is a block diagram of another illustrative optical telemetry system and is another alternative to the systems shown in FIGS. 2A-2B. The system 1000 depicted in FIG. 10A is similar to those shown in FIGS. 2A-2B in that it contains the light source 202, downlink modulator 206, receiver 208, circulator 210, fiber channel 212, coupler 214 (e.g., a 1×3 coupler), receiver 216 and uplink modulator 218. The system 1000 differs from the systems 200 of FIGS. 2A-2B in that the system 1000 further includes a depolarizer 1002 coupled between the light source 202 and the downlink modulator 206 and a polarization controller 1004 coupled between the downlink modulator 206 and the circulator 210. The positioning of the polarization controller 1004 and the downlink modulator 206 relative to the other components as shown in FIG. 10A is advantageous because it mitigates polarization drift that could occur if the light that enters the downlink modulator 206 were polarized. However, by depolarizing the light before it enters the modulator 206, at least 50% of the light will be aligned with the polarizer that is typically internal to modulators such as modulator 206. In addition, by controlling polarization of the light after the light passes through the modulator 206 (e.g., using the polarization controller 1004), the light that will be modulated by the uplink modulator 218 can be polarized to match the polar orientation of the polarizer that is internal to the uplink modulator 218.

Figure 10B:
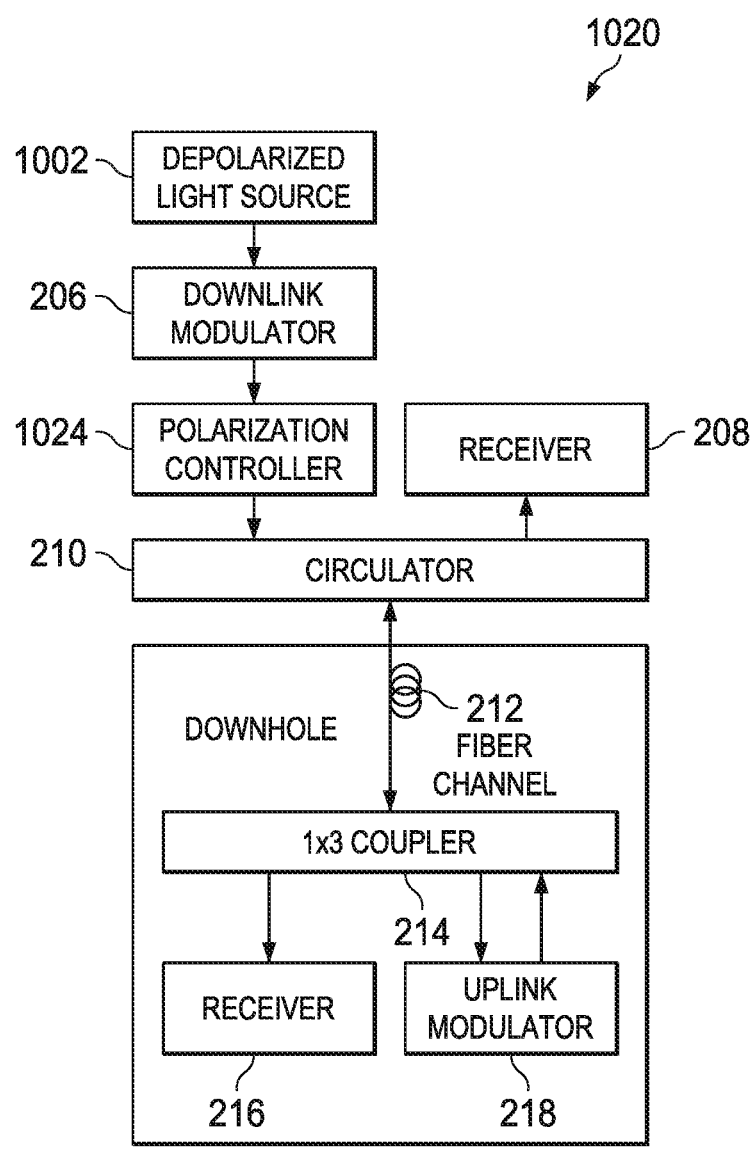
Figure 10C:
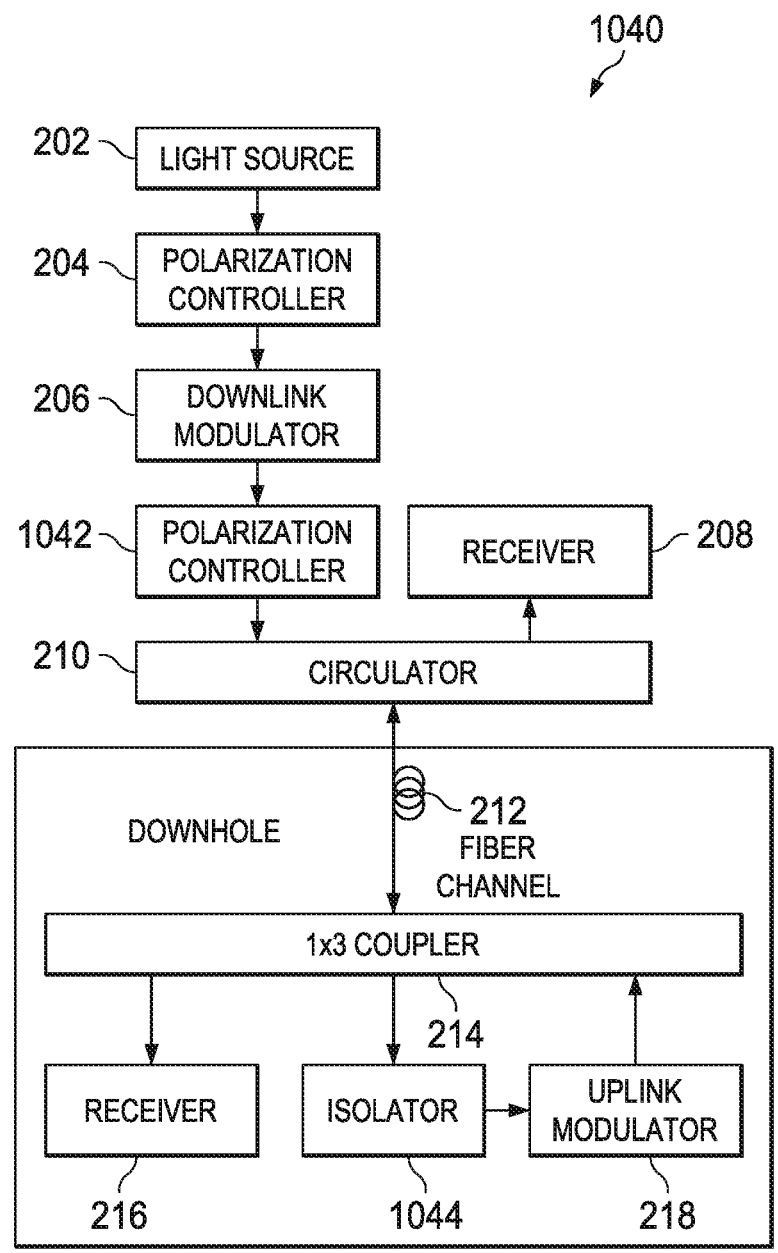

Similar mitigation of polarization drift may be achieved using the embodiments shown in FIGS. 10B and 10C. Specifically, FIG. 10B shows a system 1020 that includes several of the components depicted in FIGS. 2A-2B, including the downlink modulator 206, receiver 208, circulator 210, fiber channel 212, coupler 214 (e.g., 1×3 coupler), receiver 216, and uplink modulator 218. The system 1020 further includes a depolarized light source 1022 positioned upstream of the downlink modulator 206, and a polarization controller 1024 positioned between the downlink modulator 206 and the circulator 210. The depolarized light source 1022 and the polarization controller 1024, having the specific positions shown in FIG. 10B, achieve the same or similar anti-polarization drift effect as the depolarizer 1002 and the polarization controller 1004 in FIG. 10A. As explained above, in at least some embodiments, a polarization scrambler may be used in lieu of a depolarization controller.

Similarly, FIG. 10C shows a system 1040 that includes several components shown in FIGS. 2A-2B, including the light source 202, polarization controller 204, downlink modulator 206, receiver 208, circulator 210, fiber channel 212, coupler 214 (e.g., a 1×3 coupler), receiver 216, and uplink modulator 218. The system 1040 further includes a polarization controller 1042 between the downlink modulator 206 and the circulator 210. This specific positioning of the polarization controller 1042 achieves the same or similar anti-polarization drift effect as that achieved in the systems of FIGS. 10A-10B.

Figure 11:
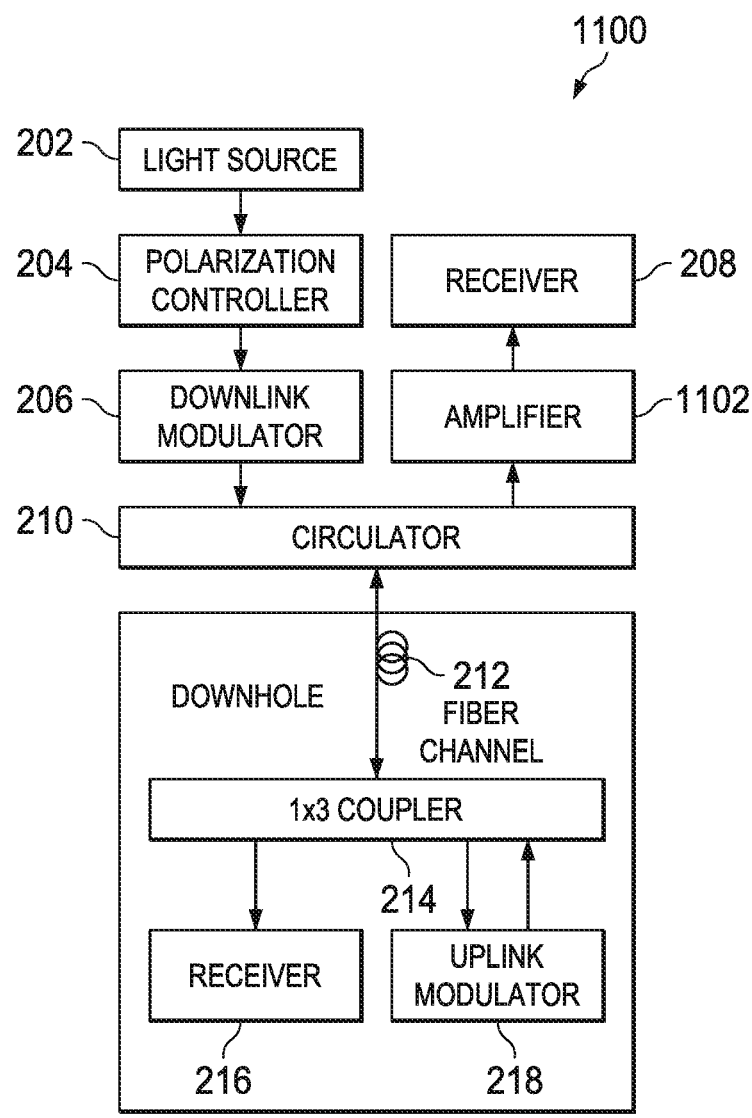

FIG. 11 is a block diagram of another illustrative optical telemetry system and is another alternative to the systems shown in FIGS. 2A-2B. The system 1100 contains several of the components shown in FIGS. 2A-2B, including the light source 202, polarization controller 204, downlink modulator 206, receiver 208, circulator 210, fiber channel 212, coupler 214 (e.g., a 1×3 coupler), receiver 216 and uplink modulator 218. The system 1100 additionally includes an amplifier 1102 to amplify the signal received at the receiver 208. In some embodiments, the amplifier 1102 is repositioned to another location within the system 1100 to amplify optical signal(s) as necessary. In some embodiments, more than one amplifier is used in the system 1100 to amplify optical signal(s) as necessary.

Each of the systems described herein, in at least some embodiments, operates using a modified half-duplex telemetry scheme. To facilitate an explanation of such a scheme, the fiber optic channel between the surface and downhole equipment in each of these systems may be modeled as a single, continuous channel that runs from the light source on one end (at either the surface or downhole), to the other end (either the downhole or the surface), and back to the light source again. Thus, for instance, if an embodiment has a single light source positioned at the surface, the optic channel may be modeled as a single channel extending from the light source downhole, to the downhole modulator, and back up to the light source at the surface.

Bearing in mind such a model, it is evident that modulation that occurs at any given point along the optical channel will interfere with any additional modulation that occurs downstream of that modulation, but it is also evident that any such downstream modulation will not interfere with any modulation that occurs upstream from that point. For instance, in the system 200 of FIGS. 2A-2B, the downlink modulator 206 is upstream of the uplink modulator 218 (i.e., light from the light source 202 passes through the downlink modulator 206 before it passes through the uplink modulator 218). Thus, any modulation applied to the light at the downlink modulator 206 is going to interfere with modulation attempts at the uplink modulator 218. However, modulation at the uplink modulator 218 will not interfere with modulation attempts at the downlink modulator 206. Accordingly, the uplink modulator 218 is said to give deference to the downlink modulator 206, and the downlink modulator 206 is said to have priority over the uplink modulator 218. Thus, the telemetry in systems 200 may be monitored using any of a variety of well-known techniques to ensure that uplink sessions only occur when the downlink modulator 206 is not modulating the light. However, no such restriction is necessary during downlink sessions, meaning that downlink sessions can occur irrespective of whether the uplink modulator 218 is modulating the light (since any uplink modulation occurs at the modulator 218 and does not interfere with downlink telemetry). However, the latter situation should be avoided if possible so that the uplink modulator 218 can complete its telemetry session without impediment.

Figure 12:
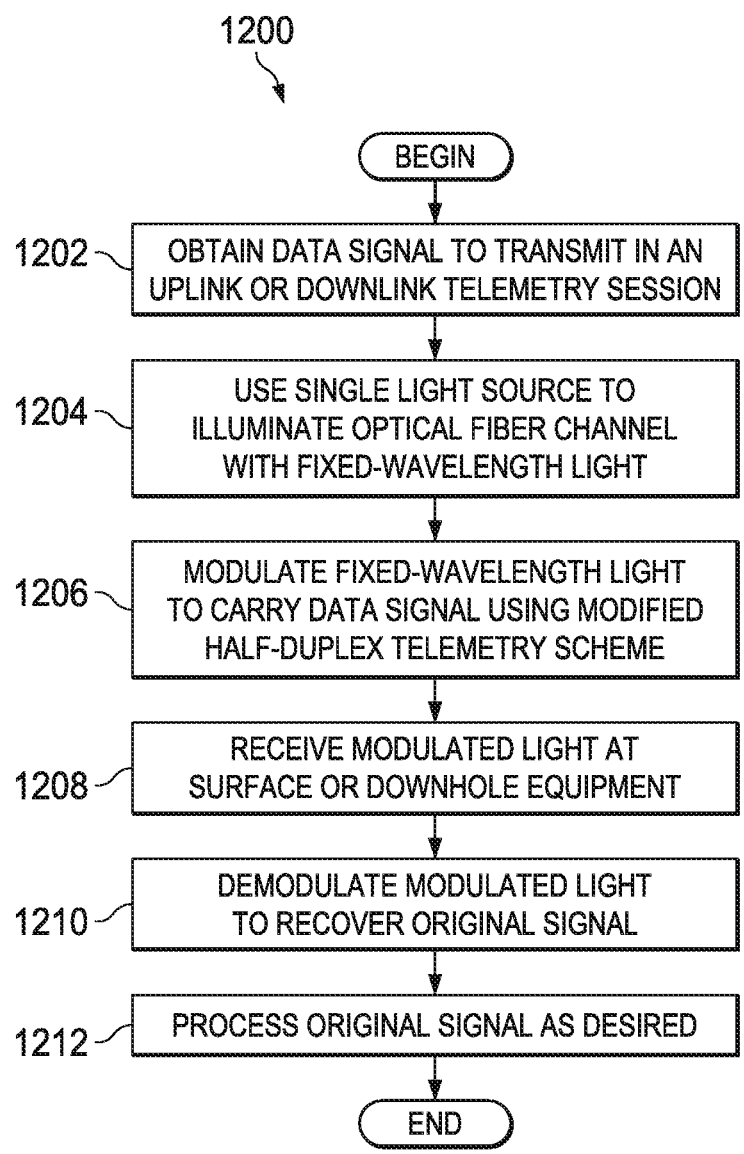
FIG. 12 is a flow diagram of a method for communicating signals via the fixed-wavelength fiber optic telemetry systems of FIGS. 2-11.

FIG. 12 is a flow diagram of a method 1200 to communicate data using one or more of the optical telemetry systems described herein. The method 1200 begins with obtaining a data signal to transmit in an uplink or downlink telemetry session (step 1202). Such data may be obtained, for instance, from a downhole tool (e.g., a CCL) or it may be data that must be transmitted from the surface to downhole equipment. The scope of disclosure is not limited to the transmission of any particular type of data. The method 1200 next includes using a single light source to illuminate an optical fiber channel with fixed-wavelength light (step 1204). As explained, this single light source may take any suitable form and may be positioned at the surface or downhole. The scope of disclosure, however, is not limited to embodiments having a single light source, and in some embodiments, multiple light sources may be used. The method 1200 next includes modulating the fixed-wavelength light to carry the data signal using a modified half-duplex telemetry scheme (step 1206). The modulated light is then received at the surface equipment or at the downhole equipment (step 1208), and the modulated light is demodulated to recover the original data signal (step 1210). Finally, the method 1200 comprises processing the original data signal as desired and appropriate (step 1212). The method 1200 may be modified in any suitable manner, including the addition, deletion or modification of the steps and/or the order in which they are performed.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense. Further, the term "couple," as used herein, implies a direct or indirect connection between two or more components.

In at least some embodiments, a system comprises: a light source; a fiber optic cable coupled to surface equipment and to downhole equipment and illuminated with fixed-wavelength light by said light source; and a modulator to modulate said fixed-wavelength light in the fiber optic cable to communicate data between the surface equipment and the downhole equipment, wherein the modulator uses a modified half-duplex telemetry scheme. Some such embodiments may be supplemented in various ways, including by one or more of the following concepts, in any order and in any combination: wherein the fiber optic cable is illuminated only by said light source; further comprising a circulator that directs said fixed-wavelength light from the modulator to the fiber optic cable and from the fiber optic cable to a receiver or coupler; further comprising a coupler that divides a single channel in the fiber optic cable into multiple separate channels; wherein at least two of the multiple separate channels couple to the modulator and at least one of said multiple separate channels couples to a receiver; wherein at least one of the multiple separate channels directs said fixed-wavelength light to another coupler, wherein said another coupler directs said fixed-wavelength light to and receives said fixed-wavelength light from said modulator; wherein at least one of the multiple separate channels directs said fixed-wavelength light to said modulator, and wherein said modulator directs said fixed-wavelength light to a mirror, and wherein said mirror directs said fixed-wavelength light back to said modulator; wherein said light source is positioned at the Earth's surface; wherein the downhole equipment includes a tool that determines a subterranean formation property and communicates data representing said property to the surface equipment using the modulator and fiber optic cable; wherein the light source is selected from the group consisting of: a laser, a light-emitting diode, and an amplified spontaneous emission source; further comprising an isolator that directs said fixed-wavelength light between a coupler and said modulator; wherein the isolator is positioned at the Earth's surface; further comprising an amplifier that directs said fixed-wavelength light to a receiver; further comprising a depolarizer coupled to the light source and to the modulator, and further comprising a polarization controller coupled to the modulator and to a circulator, said circulator directs said fixed-wavelength light to the fiber optic cable; wherein said light source is a depolarized light source, and further comprising a polarization controller that directs said fixed-wavelength light from said modulator to a circulator, said circulator directs said fixed-wavelength light to the fiber optic cable; further comprising a first polarization controller that provides said fixed-wavelength wavelength light to said modulator, and further comprising a second polarization controller that receives said fixed-wavelength light from the modulator.

In at least some embodiments, a system comprises: a directly-driven light source to output modulated, fixed-wavelength light; and a fiber optic cable couplable to surface equipment and to downhole equipment and illuminated by said modulated, fixed-wavelength light, wherein the fiber optic cable carries said modulated light using a modified half-duplex telemetry scheme. Some such embodiments may be supplemented in various ways, including using the following concept: wherein the surface equipment comprises a circulator and a receiver, said circulator couples to the directly-driven light source and to the fiber optic cable, and wherein the downhole equipment comprises a coupler, another receiver and a modulator, said coupler couples to the fiber optic cable and to the receiver and the modulator.

In at least some embodiments, a method comprises: providing fixed-wavelength light into a fiber optic cable; using a downhole tool to detect a subterranean formation property; and modulating said fixed-wavelength light in accordance with a signal produced by the downhole tool. Some such embodiments may be supplemented in various ways, including using the following concept: wherein said providing and said modulating comprise using a directly-driven light source.

We claim:

1. A system, comprising: a light source having a fixed-wavelength and coupled to a fiber optic cable configured to transmit data along the fiber optic cable; a downlink modulator coupled to the fiber optic cable that modulates the fixed-wavelength to include downlink data transmitted to downhole equipment; a coupler coupled to the downlink modulator through the fiber optic cable and configured to split modulated light from the downlink modulator into multiple channels; an uplink modulator located downstream of the downlink modulator and coupled to the coupler and configured to receive and transmit uplink data to the controller; an uplink receiver coupled to the coupler and configured to receive the uplink data from the coupler; and a downlink receiver coupled to the coupler and configured to receive data from one of the multiple channels and convert light to voltage for data processing, wherein the coupler has unidirectional communication with the downlink modulator and has bidirectional communication with the uplink modulator.

2. The system of claim 1, wherein the only by said the light source is located at the Earth's surface.

3. The system of claim 1, further comprising a circulator that directs the fixed-wavelength light from the downlink modulator to the fiber optic cable and from the fiber optic cable to the downlink receiver, the uplink receiver, or the coupler.

4. The system of claim 1, wherein at least two of the multiple channels couple to the uplink modulator and at least one of said the multiple separate channels couples to the downlink receiver.

5. The system of claim 4, wherein at least one of the multiple channels directs the fixed-wavelength light to another coupler, wherein the another coupler directs the fixed-wavelength light to and receives the fixed-wavelength light from the uplink modulator.

6. The system of claim 5, wherein at least one of the multiple channels directs the fixed-wavelength light to the uplink modulator, and wherein the uplink modulator directs the fixed-wavelength light to a mirror, and wherein the mirror directs the fixed-wavelength light back to the uplink modulator.

7. The system of claim 1, wherein the light source, the downlink modulator, and uplink modulator comprise surface equipment and the coupler, the downlink receiver, and the uplink modulator comprise downhole equipment.

8. The system of claim 7, wherein the downhole equipment includes a tool that determines a subterranean formation property and communicates data representing the property to the surface equipment using the uplink modulator and fiber optic cable.

9. The system of claim 1, wherein the light source is selected from the group consisting of: a laser, a light-emitting diode, and an amplified spontaneous emission source.

10. The system of claim 1, further comprising an uplink isolator that directs the fixed-wavelength light between the coupler and the uplink modulator.

11. The system of claim 10, wherein the uplink isolator is positioned at the Earth's surface.

12. The system of claim 1, further comprising an amplifier that directs the fixed-wavelength light to the uplink receiver.

13. The system of claim 1, further comprising a depolarizer coupled to the light source and to the downlink modulator, and further comprising a polarization controller coupled to the downlink modulator and to a circulator, the circulator directs said the fixed-wavelength light to the fiber optic cable.

14. The system of claim 1, wherein the light source is a depolarized light source, and further comprising a polarization controller that directs the fixed-wavelength light from the downlink modulator to a circulator, the circulator directs the fixed-wavelength light to the fiber optic cable.

15. The systems of claim 1, further comprising a first polarization controller that provides the fixed-wavelength light to the downlink modulator, and further comprising a second polarization controller that receives the fixed-wavelength light from the downlink modulator.

16. A system, comprising: a directly-driven light source to output modulated, fixed-wavelength light; and a fiber optic cable couplable to surface equipment and to downhole equipment and illuminated by the modulated, fixed-wavelength light, wherein the surface equipment comprises the light source, a downlink modulator, and an uplink receiver and the downhole equipment comprises a coupler, a downlink receiver, and an uplink modulator, wherein the fiber optic cable carries the modulated light using a modified half-duplex telemetry scheme; and
wherein the coupler has unidirectional communication with the downlink modulator and has bidirectional communication with the uplink modulator.

17. The system of claim 16, wherein the surface equipment further comprises a circulator, the circulator couples to the directly-driven light source and to the fiber optic cable, and.

18. A method, comprising: obtaining a data signal to transmit in an uplink or downlink telemetry session; using a single light source to illuminate an optical fiber channel with fixed-wavelength light to transmit the data signal to uphole or downhole equipment, wherein the uphole equipment comprises the single light source, a downlink modulator coupled to single link source, and an uplink receiver, and the downhole equipment comprises a coupler, a downlink receiver that communicates unidirectionally with the coupler, and an uplink modulator that communicate bidirectionally with the coupler, and wherein the uplink receiver communicates unidirectionally with the coupler: using the downhole equipment to detect a subterranean formation property; and using the uplink modulator to modulate said the fixed-wavelength light in accordance with a signal produced by the downhole equipment.

19. The method of claim 18, wherein the uplink modulator communicates with the coupler only when the downlink modulator is not modulating the fixed-wavelength light.

\* \* \* \* \*